Nov. 7, 1939.  C. E. DANIELS  2,178,932
LUBRICATING DEVICE
Filed Oct. 29, 1937
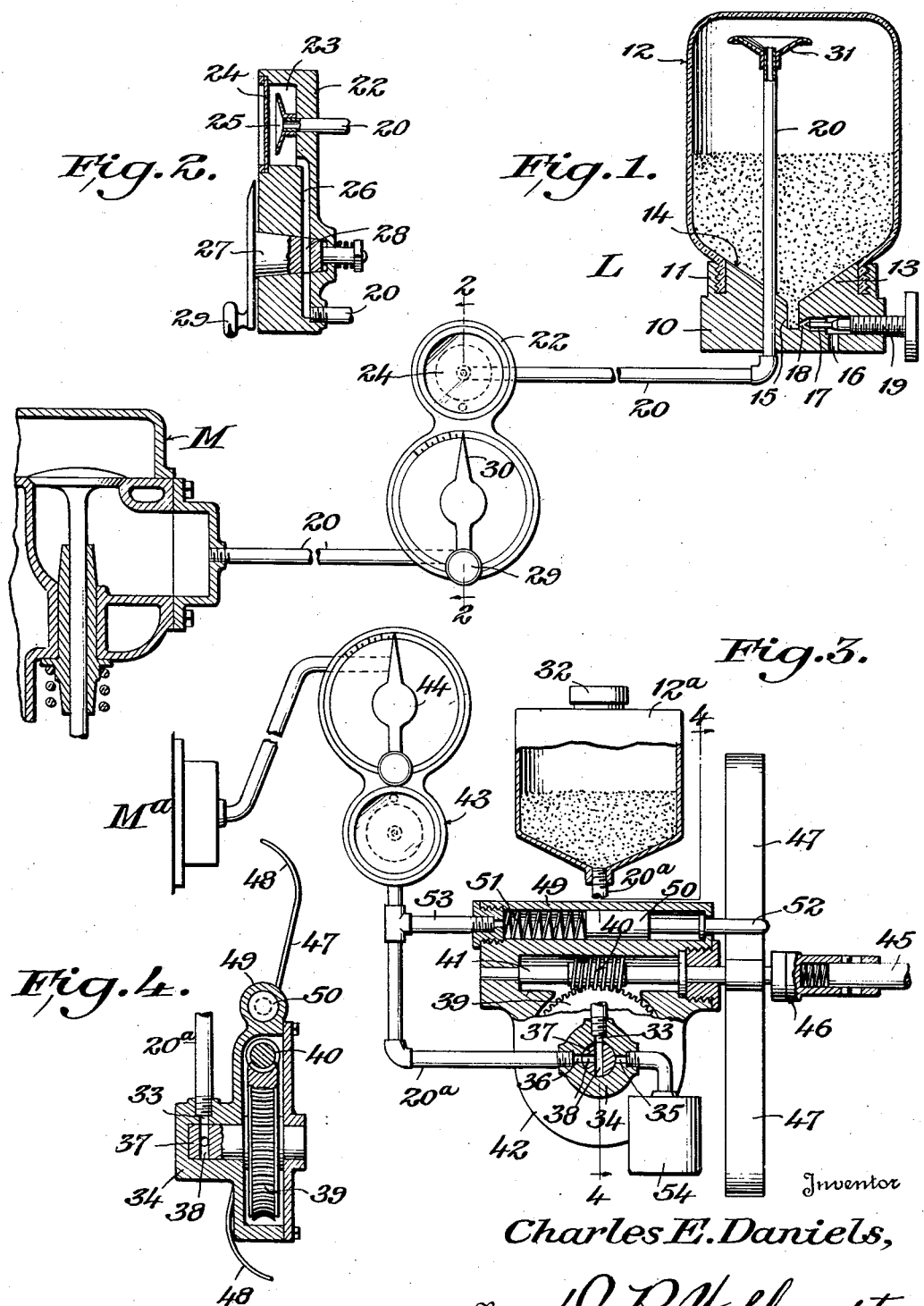
Inventor
Charles E. Daniels,
By D. P. Wolhaupter
Attorney Patented Nov. 7, 1939

2,178,932

UNITED STATES PATENT OFFICE 2,178,932

LUBRICATING DEVICE

Charles Edward Daniels, Atchison, Kans.

Application October 29, 1937, Serial No. 171,761

8 Claims. (Cl. 123—196)

This invention relates to lubricating devices, and has particular reference to lubricating devices for supplying a dry powder lubricant, such as graphite, mica or the like, to machines such as internal combustion engines, steam engines, pumps, compressors and the like.

Generally speaking, the object of the invention is to provide a lubricating device for supplying a dry powder lubricant, which device is of simple, inexpensive construction and thoroughly reliable and efficient in operation.

According to one form of the present invention a container for the dry powder lubricant is provided and the delivery of lubricant from said container is effected by a negative pressure created in the machine to be lubricated during the operation of the machine. In this connection a special object of the invention is to provide valve means adjustable to regulate the admission of air to the lubricant container, thereby to regulate the amount of lubricant delivered from the container to the machine, and to dispose the air inlet and the lubricant outlet relative to each other so that the air breaks up the lubricant and causes it to be delivered in suspension in the air, rather than as a compact mass.

According to another form of the invention the delivery of the lubricant is through a metering valve, and in this connection another special object of the invention is to provide for the delivery of small quantities of the lubricant and air alternately, whereby the air serves to break up the lubricant for delivery in dispersed form to the parts it is designed to lubricate.

Other objects of the invention are to provide a novel means whereby the flow of the lubricant may readily be observed; to provide a novel governor to regulate the operation of the lubricant feeding mechanism; and provide novel means for controlling starting and stopping of the mechanism.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in related views:

Figure 1 is a vertical sectional view illustrating one form of the invention.

Figure 2 is a section on the line 2—2 of Fig. 1.

Figure 3 is a view partly in elevation and partly in section illustrating another form of the invention, and Figure 4 is a section on the line 4—4 of Fig. 3.

Referring to the drawing in detail, first with particular reference to the form of the invention illustrated in Fig. 1, M designates a portion of a machine to be lubricated, such, for example, as an internal combustion engine, steam engine, pump, compressor or the like, and L designates, generally, the present lubricating device for supplying a dry powder lubricant to said machine.

The lubricating device L comprises a suitable base 10 which may be mounted on, or in juxtaposition to, the machine M in any suitable manner, and, as shown, said base is provided at its top with a collar 11 to accommodate the lower, open end of a container 12 for the dry powder lubricant.

Preferably the container 12 is formed from glass or other suitable transparent material whereby the amount of lubricant contained therein may readily be observed, but, of course, said container may be formed from any other desired material. Preferably, too, the collar 11 is either internally or externally threaded and the lower end of the container 12 is either externally or internally threaded for detachable, screw threaded engagement with said collar. However, any other suitable means may be provided for detachably mounting the container on the base 10. In any event, an upper portion 13 of the base 10 is formed with a conical depression 14 which underlies the container 12 when the latter is operatively mounted on said base and into which the lubricant gravitates from said container.

In the base 10 is a pair of small vertical openings 15 and 16, the upper end of the former of which opens into the lowermost portion of the depression 14 and the lower end of the latter of which opens through the bottom of the base 10 to the atmosphere. These openings are laterally spaced apart and are connected by a horizontal passageway 17 having therein a valve seat 18 with which cooperates a needle valve 19 or a valve of any other suitable form which is threaded in said passageway 17, or which otherwise is made adjustable, to regulate the passage of air through said opening 16; the passageway 17 and the opening 15 to the container 12.

Extending upwardly from the base 10 so as to be disposed within and to reach nearly to the top of the container 12 when the latter is operatively mounted on said base, is a lubricant and air outlet or delivery tube 20 which, at its upper end, is open, and which, at its other end, is connected, either directly or indirectly, with a part of the machine M in which a negative pressure is created when the machine is in operation.

Preferably the tube 20 does not lead directly to the machine M, but has interposed therein a means whereby the feed of the lubricant may readily be observed and a means for regulating the amount of lubricant fed for any given setting of the needle valve 19. The first of these means may comprise, as shown, a casing 22 having therein a chamber 23 closed at its front by a cover 24 of glass or other suitable transparent material and having connected therewith and opening into said chamber a section of the tube 20 which leads from the container 12. Within said chamber, in surrounding relationship to the end of the said section of the tube 20, which opens into said chamber at the back thereof, is a mirror or the like 25 across which the lubricant passes in its flow to the machine M and which serves the purpose of providing a suitable background against which the flow of the lubricant is plainly visible through the transparent cover 24.

The casing 22 has formed therein a passageway 26 which, at one end, communicates with a lower portion of the chamber 23 and which, at its other end, is connected by a second section of the tube 20 with the machine M. In the casing 22 is a rotary valve 27 having therein a part 28 for alinement with and disalinement from said passageway 26 by rotation of said valve, thus either to permit an unobstructed flow of lubricant through said passageway, or a throttled flow of the lubricant, or a complete stoppage of flow of the lubricant, depending upon whether the valve 27 is fully open, or partly closed, or completely closed. The valve 27 is equipped with an operating handle 29 for effecting its rotation, and with a pointer 30 for cooperation with graduations on the front of the casing 22 to indicate opened, closed and partially opened positions of said valve.

The operation of the device, assuming a quantity of dry lubricant to be contained in the container 12, is as follows: Suction in the part of the machine with which the tube 20 is connected results in creating a negative pressure within the container 12, and when the valve 19 is opened and the valve 27 is fully or partly opened, this negative pressure results in air being drawn through the opening 16, the passageway 17 and the opening 15, into the container 12 and through the tube 20 and the casing 22 to the machine M. Since the opening 15 is located at the bottom of the body of dry lubricant the air flowing inwardly through said opening passes through the lubricant and carries some of the lubricant with it in suspension to the upper, open end of the tube 20 and through said tube and the casing 22 to the machine M, where it is delivered to the machine parts to be lubricated. The amount of lubricant so supplied to the machine M is, of course, regulated by regulation of the valves 19 and 27 and its flow may readily be observed through the transparent cover 24. Because of the laterally offset relationship of the openings 15 and 16 the lubricant is prevented from gravitating through said openings.

Preferably, but not necessarily, a disk-like deflector member 31 is mounted on the tube 20 near the upper, open end thereof to assist in causing a dispersion of the lubricant in the air within the container 12 prior to the air with the lubricant in suspension therein being delivered through the tube 20 to the machine M.

According to the form of the invention illustrated in Figs. 3 and 4, a container 12$^a$ for the dry lubricant is provided at its top with a filling opening normally closed by a cap 32 and at its bottom with a lubricant outlet tube 20$^a$ which leads to a port 33 in a valve casing 34 which is provided with two additional ports 35 and 36, the first of which opens to the atmosphere and the other of which is connected by a section of the tube 20$^a$ with a part of a machine M$^a$ in which a negative pressure is created during operation of the machine.

Within the valve casing 34 is a rotary valve 37 which is provided with ports 38 so disposed relative to each other that during rotation of said valve the port 36 and, consequently, the tube 20$^a$, is placed in communication alternately with the ports 33 and 35.

During operation of the machine M$^a$ the valve 37 is rotated in any suitable manner, and as a consequence of the suction or negative pressure in the pipe 20$^a$ and the alternate communication of said pipe with the ports 33 and 35, small amounts of the lubricant and air are alternately drawn through said pipe to the machine where they reach the parts of the latter to be lubricated, the air causing the lubricant to be dispersed as will be understood.

While the valve 37 may be driven in any suitable manner, it preferably is driven from a part of the machine to be lubricated. To this end said valve may be equipped with a worm wheel 39 having meshing therewith a worm 40 on a shaft 41 driven from any suitable part of the machine, said worm wheel and worm shaft being mounted within a suitable housing 42 mounted in any suitable manner on or adjacent to the machine.

Preferably the bottom of the container 12$^a$ is inclined toward the tube 20$^a$ to assure flow of the lubricant to said tube, and preferably, too, the tube 20$^a$ has interposed therein a means 43 whereby the flow of the lubricant may readily be observed, and a valve means 44 for regulating flow of the lubricant, these means 43 and 44 being, if desired, counterparts of the means for the same purposes described in connection with the Figs. 1 and 2 form of the invention.

Preferably a governor means is provided to maintain the speed of rotation of the valve 37 within suitable limits despite variations in the speed of the shaft which furnishes the power for driving said valve. The power shaft is designated as 45 and may comprise a shaft of the machine M$^a$ or any shaft driven from said machine. In either case, said shaft 45 has a frictional driving connection with the worm shaft 41 as indicated at 46 and the worm shaft 41 has fixed thereon a plurality of blades 47 which are flexible and which normally are curved inwardly at their ends as indicated at 48. With increase in speed of the shaft 41 the curved ends of said blades, under the action of centrifugal force and air resistance, tend to straighten and thus impose a braking action on the shaft 41, and when this braking action exceeds the friction of the driving connection 46 said connection slips.

Preferably the invention further includes means whereby the operation of the lubricant supply means is stopped immediately the tube 20$^a$ no longer is subjected to a negative pressure, and is released for operation immediately said tube 20ª is subjected to a negative pressure. This means may comprise, for example, a small cylinder 49 formed as part of the casing 34, a plunger 50 slidable in said cylinder, a spring 51 constantly tending to slide said plunger in a direction to cause a portion 52 thereof to be projected into the path of the governor blades 47, and a connection 53 between the cylinder 49 and the tube 20ª so that when said tube is subjected to a negative pressure the suction in the cylinder 49 results in the plunger 50 being slid to withdraw the portion 52 of the plunger 50 from the path of rotation of the blades 47. Thus, as is apparent, when the tube 20ª is not subjected to a negative pressure, the spring 51 projects the plunger 50 and as a consequence the portion 52 of said plunger acts as a stop for cooperation with the blades 49 to prevent operation of the lubricant supply means. On the other hand, immediately the tube 20ª is subjected to a negative pressure, the plunger 50 is retracted and the lubricant supply means is released for operation.

If desired, an air filter 54 may be associated with the port 35 to clean the air drawn through said port for admixture with the lubricant.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A lubricating device comprising a container for dry lubricant, a tube extending downwardly from an upper portion of said container to a part of a machine to be lubricated which is subjected to a negative pressure during operation of the machine, means for the regulated supply of air to said container through dry lubricant contained therein, said tube being open at its upper end and having its upper, open end facing upwardly for flow of air and lubricant from said container downwardly into the same, and a member associated with the upper end of said tube to deflect air and lubricant flowing upwardly through the container outwardly before it may pass into the upper, open end of said tube and downwardly through said tube.

2. A lubricating device comprising a container for dry lubricant, a connection between a bottom portion of said container and a part of a machine to be lubricated which is subjected to a negative pressure during operation of the machine, and driven valve means included in said connection and operable to place said connection alternately in communication with said container and with the atmosphere so that lubricant and air are alternately drawn through said connection during operation of the machine and operation of said valve.

3. A lubricating device comprising a container for dry lubricant, a valve casing having a port with which a bottom portion of said container is connected, said valve casing having two additional ports, one open to the atmosphere and the other connected with a part of a machine to be lubricated which is subjected to a negative pressure during operation of the machine, a rotary valve within said valve casing having ports disposed relative to each other so as alternately to place the port which is connected with the machine part in communication with the port connected with the container and the port which is open to the atmosphere, and means for driving said valve.

4. A lubricating device comprising a container for dry lubricant, a connection between said container and a part of a machine to be lubricated which is subjected to a negative pressure during operation of the machine, a driven valve means included in said connection and operable to place said connection alternately in communication with said container and with the atmosphere so that lubricant and air are alternately drawn through said connection during operation of the machine and operation of the valve, means for driving said valve, and governor means for maintaining the speed of operation of said valve within predetermined limits.

5. A lubricating device as set forth in claim 4 in which the means for driving said valve includes a shaft geared to said valve, a power shaft having a frictional driving connection with said first mentioned shaft, and flexible blades fixed to said first mentioned shaft and having inwardly curved ends to be straightened under the action of centrifugal force and air resistance.

6. A lubricating device as set forth in claim 2 including means controlled by the pressure in the connection between the machine and the lubricant container for controlling operation of the valve.

7. In a lubricating device of the character described, a container for dry lubricant, a connection between said container and a part of a machine to be lubricated which is subjected to a negative pressure during operation of the machine, a casing in said connection having a chamber through which the dry lubricant passes from said container to the machine, said chamber having a transparent wall through which lubricant flow through said chamber may be observed, and a mirror within said chamber behind said wall and behind the path of flow of dry lubricant through said chamber.

8. In a lubricating device of the character described, a container for dry lubricant, a casing having a chamber a wall of which is transparent, a tube connecting said container with said chamber at a point behind said transparent wall, a mirror within said chamber facing said transparent wall and disposed so that dry lubricant flowing from said container through said tube into said chamber passes over said mirror between the latter and said transparent wall whereby the flow may be observed, said casing having a passageway leading from said chamber, a manually adjustable valve controlling flow of dry lubricant through said passageway, and a tube connecting said passageway with a part of a machine to be lubricated which is subjected to a negative pressure during operation of the machine.

CHARLES EDWARD DANIELS.